(12) United States Patent
Chuang et al.

(10) Patent No.: US 6,588,736 B1
(45) Date of Patent: Jul. 8, 2003

(54) GAS/LIQUID CONTACTING, PERFORATED TRAY ASSEMBLY

(76) Inventors: Karl T. Chuang, 8742-117 Street, Edmonton, Alberta (CA), T6G1R5; Adam T. Lee, 4952 Cape Coral Dr., Dallas, TX (US) 75287

( * ) Notice: Subject to any disclaimer, the term of this patent is extended or adjusted under 35 U.S.C. 154(b) by 0 days.

(21) Appl. No.: 09/736,094

(22) Filed: Dec. 14, 2000

(51) Int. Cl.⁷ .................................................. B01F 3/04
(52) U.S. Cl. ................................. 261/114.3; 261/114.5
(58) Field of Search ........................... 261/114.1, 114.3, 261/114.4, 114.5

(56) References Cited

U.S. PATENT DOCUMENTS

| | | | | |
|---|---|---|---|---|
| 3,246,887 A | * | 4/1966 | De Goederen | 261/114.1 |
| 3,463,464 A | * | 8/1969 | Nutter et al. | 261/114.1 |
| 5,360,583 A | * | 11/1994 | Nutter | 261/114.3 |
| 5,911,922 A | * | 6/1999 | Hauser et al. | 261/114.4 |
| 6,145,816 A | * | 11/2000 | Chuang et al. | 261/114.4 |

FOREIGN PATENT DOCUMENTS

| | | | | |
|---|---|---|---|---|
| GB | 1020653 | * | 2/1966 | 261/114.4 |
| SU | 1000048 | * | 2/1983 | 261/114.1 |
| SU | 1053842 | * | 11/1983 | 261/114.3 |

* cited by examiner

Primary Examiner—C. Scott Bushey

(57) ABSTRACT

A gas/liquid contacting tray assembly is provided, including a perforated sheet and elongated cover strips arching over the perforations in the sheet. The cover strips have slots with liquid conveying strips in them for conveying liquid along the slots while mixing gas therewith. This reduces stagnant areas downstream of the cover strips, and sedimentation of solids in these areas, thus increasing the gas/liquid mixing and handling capacity while reducing the frequency of shut downs. A further slot, extending in the opposite direction to the one above, may be provided in the cover strip and have a conveying strip for conveying liquid mixed with gas to the other end of the cover strip and further reducing the formation of stagnant areas. The cover strips may taper inwardly width-wise in a downstream direction.

7 Claims, 2 Drawing Sheets

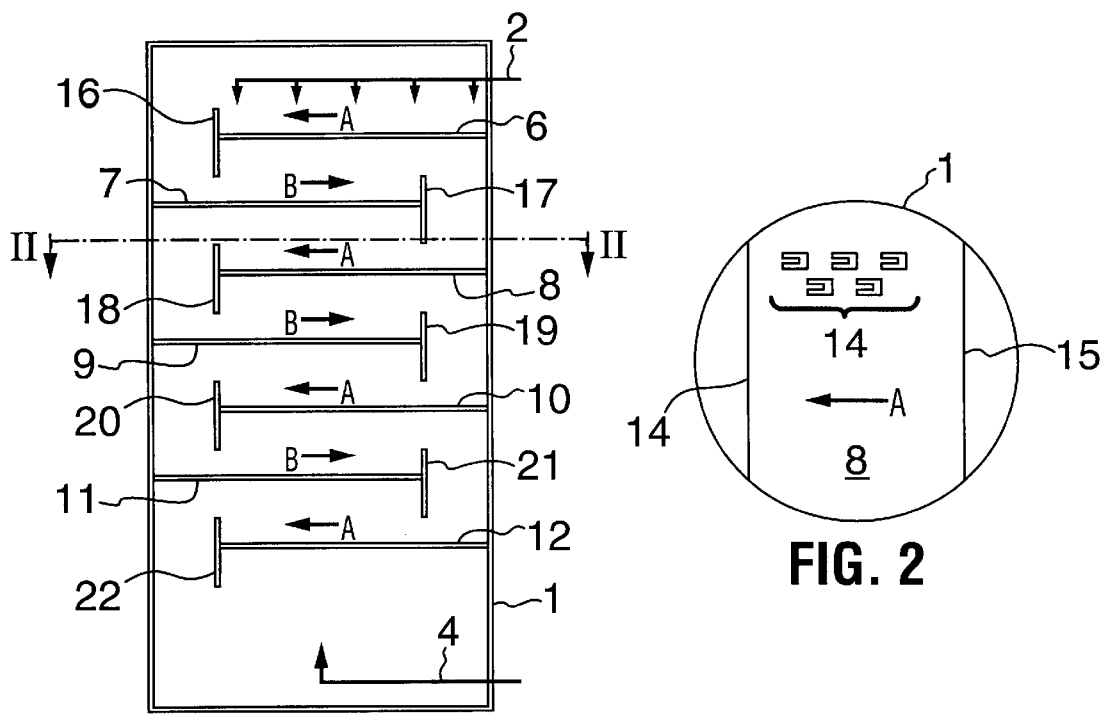
FIG. 1
FIG. 2
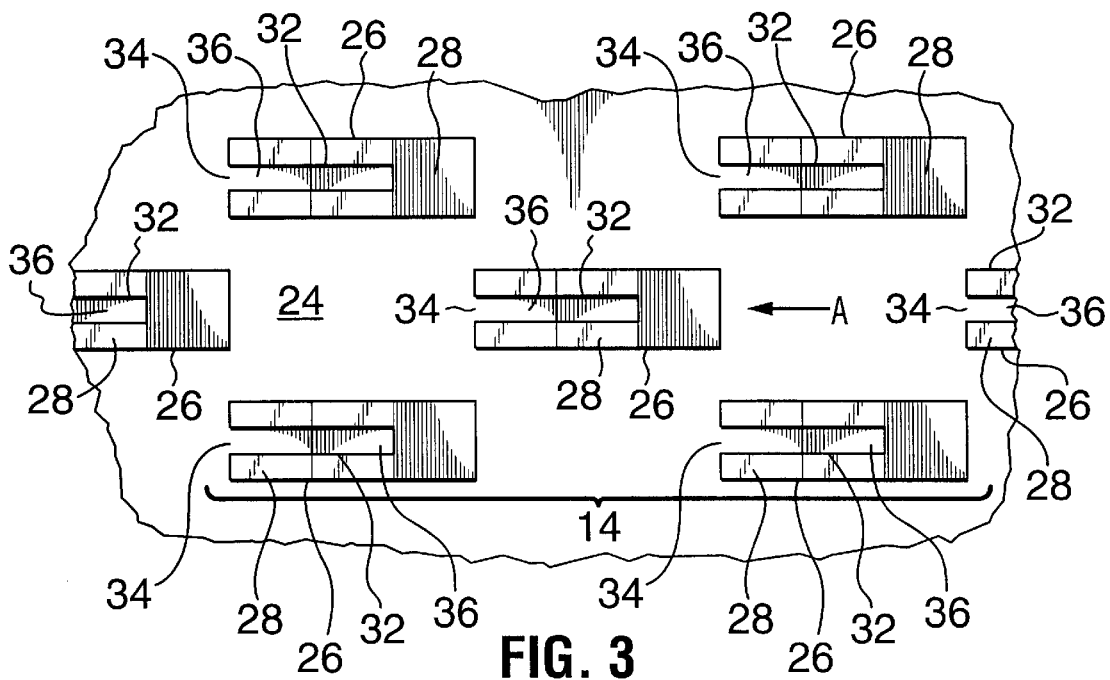
FIG. 3

GAS/LIQUID CONTACTING, PERFORATED TRAY ASSEMBLY

BACKGROUND OF THE INVENTION

Perforated trays with downcomers are one of the most commonly used internals in industrial columns for contacting a gas and a liquid. In such columns, liquid flows across the trays and down through the downcomers, from tray to tray, while gas permeates upwardly through the trays foaming liquid thereon.

Many perforated trays are a simple sieve tray, i.e., a sheet with an array of circular perforations or holes. Some perforated trays have valves or fixed deflection caps covering the perforations to increase the contact between the liquid and the gas and thus enhance the efficiency and the gas/liquid handling capacity of the column containing the trays.

Columns containing perforated trays, may be used in, for example, processes where distillation, absorption and stripping operations are involved and wherein solids are present in particulate form, see, for example, "Subdue Solids in Tower" A. W. Stoley et al, "Distillation and Other Industrial Separation", page 95 to 104, dated January 1995, published in Chemical Engineering Progress.

Stoley et al, L/H column, page 97, under the heading "Basic Approaches" states that when solids are unavoidable, the best approach is to keep them moving, and that designing the equipment to keep them moving is critical. The more active the liquid, the lower the probability of plugging. Further, Stoley et al, page 98, L/H column, under "Trays" states that bubble cap trays have been commonly used in solids containing systems and, having large open spaces, prevent blockage by solids' sedimentation. The disadvantages with bubble-cap trays is that they are expensive, have low capacity, and are not suitable in high-solids-loading services with particles that stick to the tray.

U.S. Pat. No. 3,463,464, dated Aug. 26, 1969, and U.S. Pat. No. 5,360,583, dated Nov. 1, 1994, improved the efficiency and capacity by providing trapezoidal openings in the plane of the tray deck and a stationary deflector overlying each opening and aligned therewith. The deflector, and the adjacent deck surface, defines lateral outlet slots which are oriented to direct vapor passing up through that aperture in generally transverse directions to the flow of liquid across the deck.

While these trapezoidal openings and stationary deflectors are an improvement, there is still a problem in that gas tends to flow back on the stationary deflector causing build-up of, and fouling by, solids at a downstream ends of the stationary deflectors, thus reducing the efficiency and capacity of the column.

There is a need for a gas/liquid contacting, perforated tray assembly, wherein back flow on a stationary deflector or cover strip is reduced thereby reducing build-up and fouling by solids at the downstream ends of the stationary deflectors or cover strips.

SUMMARY OF THE INVENTION

According to the present invention there is provided a gas/liquid contacting, perforated tray assembly, comprising,
 a) a perforated sheet having an array of elongated openings, whereby, in operation, liquid flowing over the sheet, and along the openings, will be mixed with gas flowing upwardly through the openings, and, for each opening,
 b) an elongated cover strip, arching upwardly over and spanning the length of that opening, and having a slot extending from one end thereof into an upper portion thereof, and
 c) a liquid conveying strip in the slot and having a first portion extending along a bottom portion of the slot, from the said one end, and a second, portion sloping upwardly to the top of the cover to provide,
  i) a liquid path along the slot, and
  ii) side outlets for directing gas from the opening into each side of the liquid path.

Preferably each slot extends from an upstream end of the cover strip.

In some embodiments of the present invention, each elongated opening, and cover strip therefor, are tapered inwardly in the downstream direction.

In other embodiments of the present invention the liquid conveying stip is a first liquid conveying strip, and each cover strip has a second slot extending from an opposite end to the said one end into an upper portion thereof, and, for each second slot there is provided a further liquid conveying strip in that slot, each further liquid conveying strip having a first portion extending progressively downwardly from the cover strip to a lower portion of that slot, and a second portion extending along a bottom portion of that slot, to provide,
 i) a second liquid path along the slot, and
 ii) side outlets for directing gas from the opening into each side of the second liquids path.

Each elongated-opening, and cover strip therefor, may be tapered inwardly across the width in the liquid downstream direction.

The cover strips and the liquid conveying strips may be integral with the perforated sheet.

In other embodiments of the present invention, the cover strips, and the conveying strips are integral with the perforated sheet.

In this specification, upstream and downstream means upstream and downstream of liquid flow across a perforated tray.

BRIEF DESCRIPTION OF THE DRAWINGS

In the accompanying drawings which illustrate, by way of example, embodiments of the present invention, FIG. 1 is a diagrammatic side view of a gas/liquid contacting apparatus.

FIG. 2 is a diagrammatic plan view along II—II, FIG. 1,

FIG. 3 is an enlarged plan view of a portion of the perforated tray shown in FIG. 2.

DETAILED DESCRIPTION

Figure 4:
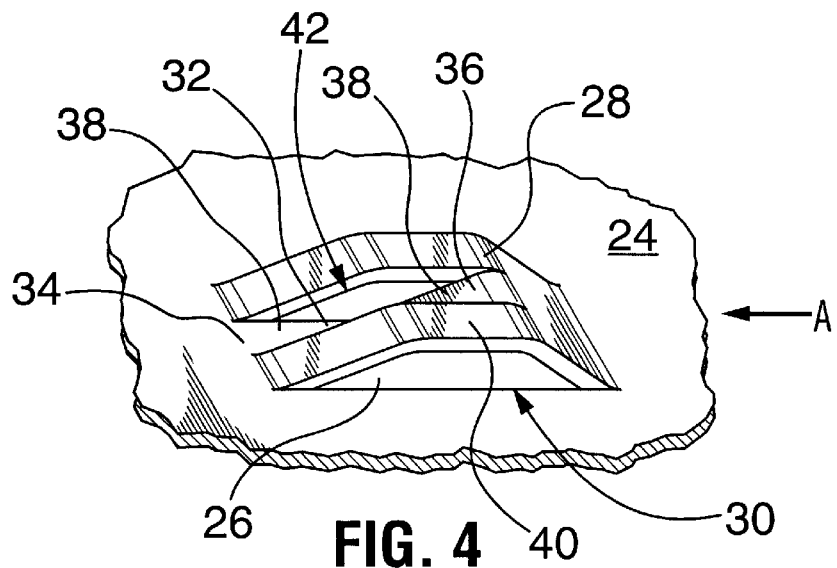
FIG. 4 is an enlarged, perspective from above of a portion of the perforated tray shown in FIG. 3, containing a perforation and a cover strip over that perforation.

FIGS. 1 and 2 show schematically a gas/liquid contacting apparatus comprising a casing 1, a liquid inlet and distributing device 2, a gas inlet device 4, perforated trays 6 to 12 having an array of perforations, cover strips, some of which are shown in FIG. 2 and generally designated 14, and downcomers 16 to 22.

In operation, liquid enters the casing 1 by the device 2 while gas is fed therein by the device 4.

The liquid flows across the trays in the directions A and B, and over the downcomers 16 to 22 to the tray below, while gas flows upwardly through the perforations, such as those designated 14, to froth the liquid flowing across the trays.

FIG. 3 is an enlarged, scrap, plan view showing the array configuration of some of the perforations, with cover strips, which are designated 14 in FIG. 2, and FIG. 4 is an isometric, scrap view of one of the perforations with a cover strip 14 shown in FIG. 3.

It should be noted that the perforations with cover strips 14 shown in FIGS. 2, 3 and 4 are for perforated trays across which the liquid flows in the direction of arrow A (FIG. 1). For perforated trays where the liquid flows across them in the direction of arrow B (FIG. 1), the cover strips 14 face in the opposite direction to those shown in FIGS. 3 and 4. It should also be noted that in other embodiments of the present invention, the liquid may flow over the perforations and cover strips 14 in the opposite direction to that indicated by arrow A.

In FIGS. 3 and 4, there is shown a portion of a gas/liquid contacting, perforated tray assembly, comprising,
a) a portion of a perforated sheet 24 having an array of elongated openings 26, whereby, in operation, liquid flowing over the sheet 24, in the general direction of arrow A, and along the openings 26 will be mixed with gas flowing upwardly through the openings 26, and, for each opening 26, there is provided,
b) an elongated, cover strip 28, arching upwardly over gas outlets, such as gas outlet 30 (FIG. 4), from that opening, and spanning the length of that opening 26, the cover strip 28 having a slot 32 extending from one end 34 thereof, into an upper portion thereof, and,
c) a liquid conveying strip 36 in the slot 32, and, as shown in FIG. 4, having a first portion extending along a bottom portion of the slot 32 from the end 34, and a second portion 38 extending progressively upwardly from the first portion to the top 40 of the cover strip 28, to provide,
i) a liquid path along the slot 32, and,
ii) side outlets, such as side outlet 42 (FIG. 4) for directing gas from the opening 26 into each side of the liquid path.

In some embodiments, the cover strip 28 may taper inwardly across the width in a downstream direction, as shown in FIG. 4.

In operation, with liquid flowing across the portion of the tray 24, in the direction of arrow B, and gas flowing upwardly through the openings 26, some of the liquid will flow around each cover strip 28, while other liquid will flow over each cover strip 28. Some of the liquid flowing over each cover strip 28 will be channeled along the slot 32 therein. At the same time gas flowing upwardly through each opening 26 will be divided so that portions thereof will exit in generally lateral directions from each side of the cover strips 28 through the gas outlets 30 (FIG. 4), while other portions of the gas will exit in generally lateral directions from the side outlets 42 into the liquid paths along the slots 32.

The gas exiting through the gas outlets 30 tend to push liquid flowing around the cover strips 28 away from them and create a back flow immediately downstream of each cover strip 28, resulting in stagnant areas in which build-up of, and fouling by, solids in the liquid at the downstream end of each cover strip 28.

This problem is further exacerbated in that liquid flowing over each cover strip 28 tends to create a stagnant area immediately downstream of that cover strip 28. This may be due to what is generally known as the "COANDA effect", and tends to cause further build-up of, and fouling by solids at the downstream ends of the cover strips 28.

This build-up and fouling by solids reduces the efficiency and handling capacity of the gas/liquid contacting device containing these perforated trays 6 to 12 with cover strips 28.

However, the provision of the slots 32 in the cover strips 28, and the liquid conveying strips 36 in these slots 32, causes liquid to travel downwardly and along these slots 32, and be mixed with gas emerging from the side outlets 42, and then emerge at the downstream end of each cover strip 28. This has the effects of,
i) reducing the tendency of gas from the gas outlets 30 from causing stagnant areas immediately downstream of each cover strip 28, by the upward flow produced by gas from the side outlets, such as 14, tending to counterbalance the outward flow of gas from the gas outlets 30,
ii) breaking up any flow over each cover strip 28 and thus reducing any formation of stagnant areas downstream of each cover strip 28 from this, and
iii) conveying gas/liquid mixture to the perforated sheet at the downstream end of each cover strip 28 to wash away solids in these areas.

Reducing the formation of stagnant areas downstream of each cover strip in this manner, and washing away solids in this manner, results in reducing the build-up of solids in these areas, which results in a significant increase in the efficiency of, and handling capacity of, gas/liquid contacting apparatus containing these cover strips 28 with slots 32 and liquid deflecting strips 36. This has the added advantage in that the frequency of downtimes for cleaning such gas/liquid is significantly less than that of conventional gas/liquid contacting apparatus.

Tapering the cover strips 28 inwardly across their widths, in a downstream direction, has the effect of synergistically enhancing the previously mentioned desirable reductions in the formulation of stagnant areas immediately downstream of the cover strips 28.

If, as in other embodiments of the present invention, the liquid flow is in the opposite direction to arrow A, then at least the desirable effects i) and ii) given above are obtained.

Figure 5:
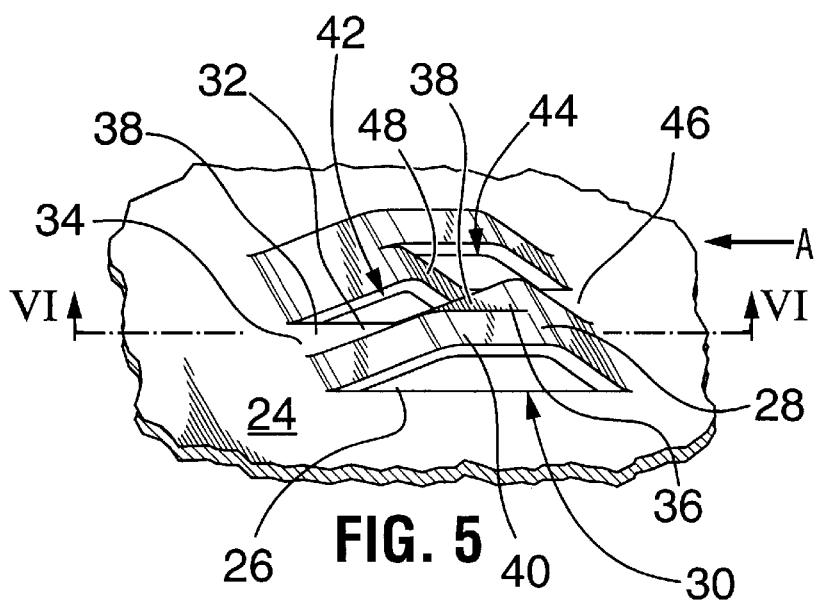
FIG. 5 is a similar view to FIG. 4, but of a different embodiment.
Figure 6:
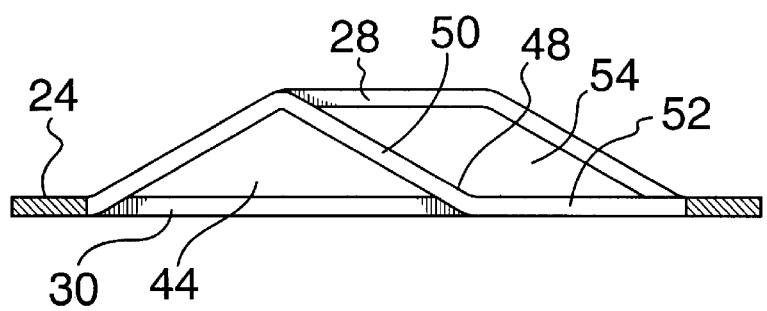
FIG. 6 is a sectioned, side view along VI—VI, FIG. 5.

In FIGS. 5 and 6, parts similar to those shown in FIGS. 1 to 4 are designated by the same reference numerals, and the previous description is relied upon to describe them.

In FIGS. 5 and 6, the liquid conveying strip 36 is in a first liquid conveying strip, and the cover strip 28 of FIG. 5, is provided with a second slot 44 extending from an opposite end 46 to that at the end 34 into an upper portion of the top 40. A liquid conveying strip 48 is provided in the second slot 44. The liquid conveying strip 48 has a first portion 50 (FIG. 6) extending progressively downwardly from the cover strip 28 to a lower portion 52 extending along a bottom portion of the slot 44, to provide,
i) a second liquid path along the slot 44, and
ii) side outlets, such as that designated 54 in FIG. 6, for directing gas from the opening 26 into each side of the second liquid path.

The embodiment shown in FIGS. 5 and 6 functions in a similar manner to that described with reference to FIGS. 3 and 4, except that liquid conveyed upwardly by conveying strips 48 is mixed with gas from each side by the gas supply outlets, such as outlet 54 and this causes,
i) a further drawing in of liquid flowing around the cover strip 28, and ii) gas mixed with liquid to be fed over the cover strip 28 to the downstream end thereof.

Thus the formation of stagnant areas immediately downstream of the cover strips 28 is further reduced to the extent where they are substantially eliminated, and the efficiency and handling capacity of the apparatus containing the cover strips 28 further enhanced with the attendant advantage of even less frequent need for shut downs.

The embodiment shown in FIGS. 5 and 6 may, as shown in FIG. 5, also be tapered inwardly in width in the downstream direction A to try to further reduce, synergistically, the formation of stagnant areas at the downstream ends of the cover strips 28.

It should be noted that in some embodiment of the present invention, some of the cover strips 28 shown in FIGS. 5 and 6 may have the conveying strips 48 disposed on different sides of the deflecting strips 36 to others on the perforated sheet 24 in order to balance the flow of liquid, and gas/liquid mixing, more evenly across the perforated sheet 24.

While portions of the liquid conveying strips are shown extending more or less along inclined planes in FIGS. 4 to 6, it is within the scope of the present invention for these portions to extend along other paths, such as for example, curved paths.

What is claimed is:

1. A gas/liquid contacting, perforated tray assembly, comprising,
    a) a perforated sheet having an array of elongated openings, whereby, in operation, liquid flowing over the sheet, and along the openings, will be mixed with gas flowing upwardly through the openings, and, for each opening,
    b) an elongated cover strip, arching upwardly over gas outlets from that opening, and spanning the length of that opening, the cover strip having a slot extending from one end thereof into an upper portion thereof, and
    c) a liquid conveying strip in the slot and having a first portion extending along a bottom portion of the slot, from the said one end, and a second portion extending progressively upwardly from the first portion to the top of the cover strip to provide,
        i) a liquid path along the slot, and
        ii) side outlets for directing gas from the opening into each side of the liquid path.

2. An assembly according to claim 1, wherein each slot extends from an upstream end of coner strip.

3. An assembly according to claim 1, wherein each elongated opening, and cover strip therefor, are tapered inwardly across the width in the liquid downstream direction.

4. An assembly according to claim 1, wherein, the liquid conveying strip is a first liquid conveying strip, and each cover strip has a second slot extending from an opposite end to the said one end into an upper portion thereof, and, for each second slot there is provided a further liquid conveying strip in that slot, each further liquid conveying strip having a first portion extending progressively downwardly from the cover strip to a lower portion of that slot, and a second portion extending along a bottom portion of that slot, to provide
    i) a second path along the slot, and,
    ii) side outlets for directing gas from the opening into each side of the second liquid path.

5. An assembly as claimed in claim 4, wherein each elongated opening, and cover strip therefor, are tapered inwardly in the liquid downstream direction.

6. An assembly according to claim 1, wherein the cover strips and the liquid conveying strips are integral with the perforated sheet.

7. An assembly according to claim 4, wherein the cover strips, and the liquid conveying strips are integral with the perforated sheet.

* * * * *